1,786,326

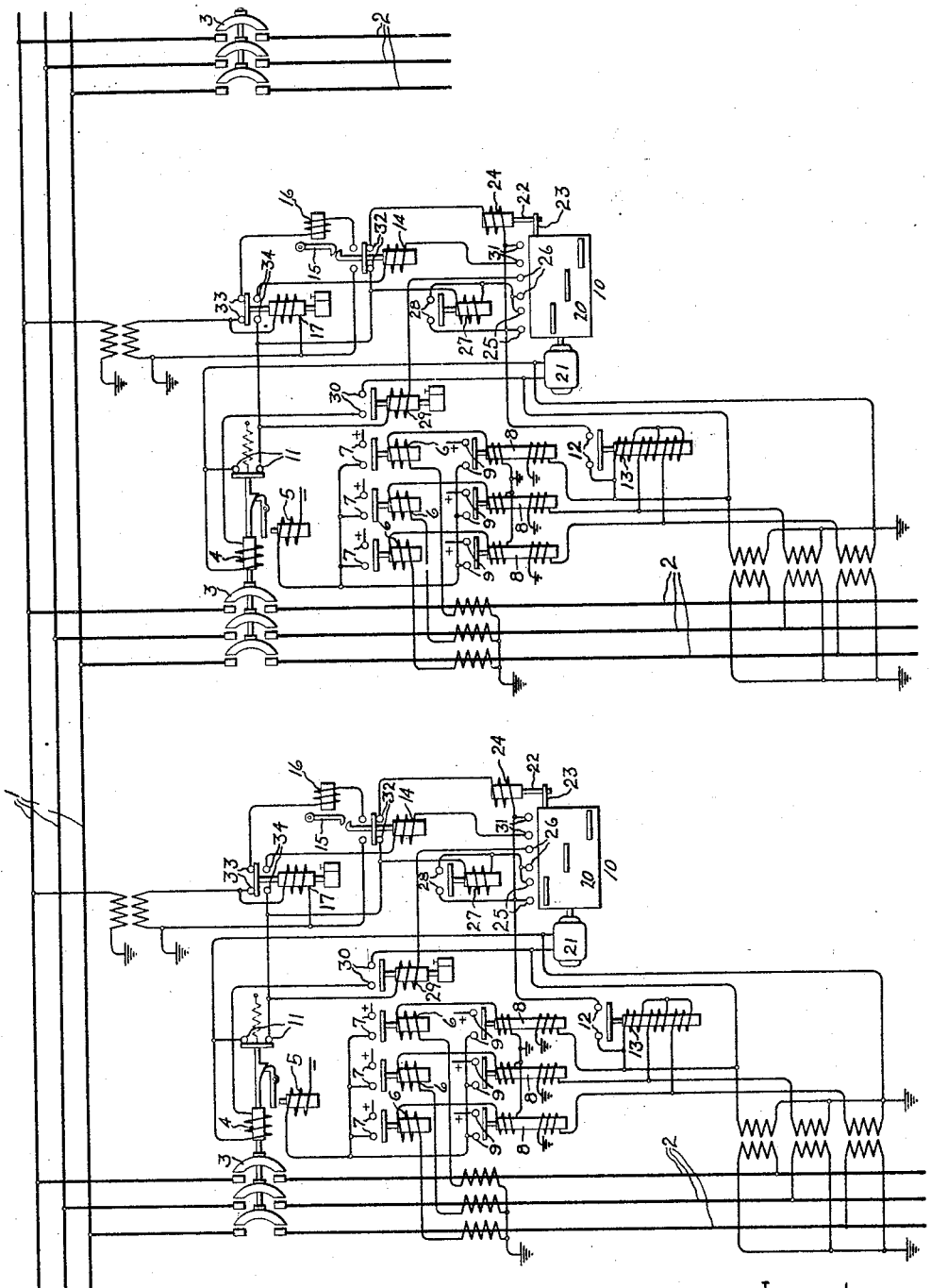
Inventors:
Arvid E. Anderson
Frederic D. King
by Charles E. Tullar
Their Attorney Patented Dec. 23, 1930

UNITED STATES PATENT OFFICE

ARVID E. ANDERSON, OF LANSDOWNE, AND FREDERIC D. KING, OF BROOKLINE, PENNSYLVANIA, ASSIGNORS TO GENERAL ELECTRIC COMPANY, A CORPORATION OF NEW YORK

AUTOMATIC SWITCHING SYSTEM

Application filed December 28, 1928. Serial No. 328,980.

Our invention relates to automatic switching systems and particularly to systems for controlling the connections between a plurality of supply circuits and a common bus or load circuit and one of its objects is to provide an arrangement which effects the reconnection of a plurality of supply circuits to the load circuit in a predetermined sequence when they have been opened by a fault on the load circuit and which prevents further reconnection of a supply circuit to the load circuit, after it has been reconnected thereto a predetermined number of times, until the load circuit voltage is restored to a predetermined value.

Another object of our invention is to provide an arrangement for controlling the automatic reclosing of a circuit breaker between a polyphase supply circuit and a polyphase load circuit so that faults on the supply circuit do not effect the locking out of the circuit breaker but faults of a predetermined character on the load circuit effect the locking out of the circuit breaker after it has been reclosed a predetermined number of times.

Our invention will be better understood from the following description when taken in connection with the accompanying drawing and its scope will be pointed out in the appended claims.

In the accompanying drawing which is a diagrammatic showing of an electric system embodying our invention, 1 represents a polyphase load circuit or bus which is arranged to be supplied from a plurality of polyphase supply circuits 2 which are connected in any suitable manner to a suitable source or sources of current (not shown). Each supply circuit 2 is arranged to be connected to the load circuit 1 by means of a switch 3 which may be of any suitable type, examples of which are well known in the art. Each switch is provided with suitable means for effecting the opening thereof under predetermined abnormal conditions and the automatic reclosing thereof after it has been opened.

Since the control apparatus associated with the various switches 3 are the same we have deemed it advisable to show in detail only the control apparatus associated with two of the switches, in order to simplify the disclosure. It is to be understood, however, that the other switches 3 may be provided with control apparatus similar to that shown in detail for two of the switches.

In the particular embodiment shown in the drawing, each switch 3 is a circuit breaker of the well known latched-in type and is provided with a closing coil 4 and a trip coil 5. Each circuit breaker is arranged to be opened in response to an overcurrent in any phase of the associated load circuit 1 and also in response to a reversal of power from the load circuit 1 to the associated supply circuit 2. For accomplishing these results, we provide an overcurrent relay 6 in each phase of each supply circuit, each relay being arranged to close its contacts 7 in an energizing circuit for the trip coil 5 of the associated circuit breaker 3 when the current in the associated phase of the supply circuit is above a predetermined value, and a power directional relay 8 for each phase of each supply circuit, each relay being arranged to close its contacts 9 in an energizing circuit for the trip coil 5 of the associated circuit breaker when reverse overcurrent flows through the associated phase.

In order to control the reconnection of each supply circuit to the load circuit after the associated overload circuit breaker 3 has been opened, we provide each switch with a suitable automatic reclosing arrangement for reclosing the switch after it has been open a predetermined length of time and for preventing further reclosing of the switch after it has been reclosed a predetermined number of times until the load circuit voltage remains above a predetermined value for a predetermined time after the switch has been reclosed said predetermined number of times.

In the particular arrangement shown in the drawing, we accomplish this result by providing each switch with a timing device 10 which is arranged to be set into operation when the associated circuit breaker 3 is open, so that its auxiliary contacts 11 are closed, and the voltage of each phase of the supply circuit 2 is above a predetermined value, as indicated by the contacts 12 of a suitable polyphase voltage relay 13 associated therewith being closed. The operation of each timing device 10 is arranged to effect the closing of the associated switch 3 a predetermined number of times. In the particular arrangement shown in the drawing each timing device is arranged to effect only one reclosing but it is obvious that this device may be arranged, in any suitable manner examples of which are well known in the art, to effect any desired number of reclosures. If at the end of a predetermined time interval after the operation of a timing device 10 has been started, the associated switch 3 is still open and the load circuit voltage is below a predetermined value, the timing device 10 is arranged to effect the operation of an associated lockout relay 14 which is so connected and arranged that after it has been energized, further operation of the timing device 10, to effect a reclosure of the circuit breaker, is prevented until the lockout relay has been restored to its normal position. Each lockout relay 14 may be of any suitable type which is so constructed that it remains in its energized position after its energizing circuit has been interrupted. In the particular arrangement shown in the drawing each lockout relay is held in its energized position by a latch 15 which is arranged to be released by a release coil 16 when it is energized. Each lockout relay 14 is controlled by an associated voltage relay 17 which is responsive to the voltage of the load circuit 1 in such a manner that the operating coil of the lockout relay can be energized only when the load circuit voltage is below a predetermined value and the associated release coil 16 for the lockout relay 14 is energized when the lockout relay is in its energized position and the load circuit voltage is above a predetermined value.

As shown in the drawing, each timing device 10 comprises a timer 20 which is driven by a motor 21 permanently connected to a suitable source of current such as the associated supply circuit 2. Each timer 10 is normally prevented from rotating by a movable stop 22 which engages a projection 23 on the timer 20. The operation of each timer is effected by the energization of a release magnet 24 which when energized moves the stop 22 out of the engagement with the projection 23. As each timer 20 rotates it is arranged to close its contacts 25 and 26 successively after the timer has been in operation a predetermined time. The contacts 25 control the circuit of an associated control relay 27 so that this relay is energized if the auxiliary contacts 11 on the associated circuit breaker 3 and the contact 12 of the associated voltage relay 13 are closed at the time the contacts 25 are closed. The relay 27 by closing its contacts 28 completes a locking circuit for itself which is independent of the timer contacts 25 so that this control relay 27 remains energized after the timer opens its contacts 25. When the timer 20 subsequently closes its contacts 26 a circuit is completed for the hesitating control relay 29 controlling the closing coil 4 of the associated circuit breaker 3. The control relay 29 by closing its contacts 20 completes the circuit of the closing coil 4 to close the circuit breaker 3.

Each timer 20 is also provided with a third set of contacts 31 which are arranged to be closed after the timer has been in operation a predetermined length of time. If the associated circuit breaker 3 is open and the load circuit voltage is below a predetermined value when the timer closes its contacts 31 a circuit is completed for the operating coil of the associated lockout relay 14 which in its energized position opens the contacts 32 in the circuit of the release magnet 24 of the timer 20. Since the lockout relay is arranged to be held in its energized position by the latch 15, further energization of the release magnet 24 to effect the operation of the timer 20 is prevented until the release coil 16 is energized to release the latch 15.

While the apparatus associated with each switch 3 is similar to that above described, the timers 20 associated with these switches are arranged in any suitable manner examples of which are well known in the art so that the time intervals elapsing between the opening of the circuit breakers and their respective reclosures are preferably different. Therefore when all of the circuit breakers are opened simultaneously in response to a fault on the load circuit, the settings of the timers are such that the circuit breakers 3 are closed in a predetermined sequence.

The operation of the arrangement disclosed in the drawing is as follows:

When a fault occurs on the load circuit 1, each circuit breaker 3 is opened by one or more of its associated overcurrent relays closing its contacts 7 and completing an energizing circuit for the trip coil 5. As soon as all of the supply circuits 2 have been disconnected from the load circuit 1 all of the voltage relays 17 become deenergized so that they open their respective contacts 33 and close their respective contacts 34.

When each circuit breaker 3 opens, a circuit is completed for the release magnet 24 of the associated timer 20 to effect the operation thereof if the associated supply current is energized. The circuit of each release magnet includes the auxiliary contacts 11 on the associated circuit breaker 3, contacts 32 of the associated lockout relay 14 and the contacts 12 of the associated voltage relay 13. The energization of the release magnet 24 moves the stop 22 out of engagement with the projection 23 so that the timer 20 is rotated by its driving motor 21.

After a predetermined time, the timer having the shortest time setting effects the successive closing of its contacts 25 and 26. The closing of the contacts 25 completes an energizing circuit for the associated control relay 27. This circuit also includes the auxiliary contacts 11 on the associated circuit breaker 3 and the contacts 12 of the associated voltage relay 13. The relay 27 by closing its contacts 28 completes a locking circuit for itself which is independent of the timer contacts 25 so that when these timer contacts are subsequently opened the control relay 27 remains in its energized position. When the timer subsequently closes its contacts 26 a circuit is completed for the associated hesitating control relay 29. This circuit also includes the auxiliary contacts 11 on the associated circuit breaker 3, contacts 28 of the control relay 27 and the contacts 12 of the associated voltage relay 13. The control relay 29 by closing its contacts 30 completes an energizing circuit for the closing coil 4 of the associated circuit breaker so that the circuit breaker closes and connects the associated supply circuits to the load circuit 1. The circuit breaker 3 by opening its auxiliary contacts 11 opens the circuits of the associated control relay 27 and release magnet 24.

After the timer having the shortest time setting has effected the reclosing of its associated circuit breaker 3, the timer having the next shortest time setting effects the reclosing of its associated circuit breaker in a similar manner. The closing of the other circuit breaker is then effected sequentially in a similar manner by their respective timers.

If the fault on the load circuit 1 is removed before anyone of the circuit breakers is reclosed, each breaker remains closed after it is reclosed and its associated timer returns to its normal position without further effecting the operation of any of the other control devices associated therewith. After the load circuit 1 has remained energized for a predetermined length of time, all of the voltage relays 17 open their respective contacts 34 and close their respective contacts 33.

If the fault on the load circuit is not removed before a circuit breaker is reclosed by its respective reclosing arrangement, its overcurrent relays effect the immediate opening thereof. When the associated timer 20 subsequently reaches its lockout position and closes its contacts 31 a circuit is then completed for the operating coil of the associated lockout relay 14 if the load circuit voltage is still below normal. The circuit of the operating coil of the lockout relay includes the contacts 12 of the associated voltage relay 13, contacts 31 of the timer 20, contacts 34 of the voltage relay 17 and contacts 11 of the circuit breaker 3. The lockout relay 14 by opening its contacts 32 interrupts the circuit of the associated release magnet 24 so that the stop 22 engages the projection 23 and prevents further operation of the timer 20 to effect reclosing of the associated circuit breaker. The lockout relay 14 is held in its energized position by the latch 15 after the energizing circuit for the operating coil thereof is interrupted by opening of the timer contacts 31.

Whenever the load circuit voltage is restored to normal and remains at this value for a predetermined length of time so that the voltage relays 17 open their respective contacts 34 and close their respective contacts 33, the release coils 16 of all the lockout relays, which are in their energized positions, are completed so as to release their respective latches and allow the lockout relays to return to their normal position. The circuits of the release magnets 24 of the timers 20 associated with all of the locked-out breakers are then again energized so that their associated timers again operate to effect the successive reclosing of the breakers in the manner above described.

Therefore, if the fault on the load circuit is removed before the last circuit breaker in the sequence effects its last reclosure so as to cause a restoration of voltage to the load 1, all of the locked-out circuit breakers, as well as those which have not been locked out at the time the fault is removed, are reclosed to reconnect their respective supply circuits to the load circuit.

In case a fault occurs on any supply circuit which causes current to flow from the load circuit to the faulty supply circuit, one or more of the associated directional relays 8 effect the energization of the trip coil 5 of the circuit breaker 3 in the faulty circuit so as to disconnect the faulty supply circuit from the load circuit.

The time settings of the power directional and overcurrent relays are preferably arranged in such a manner that the power directional relays respond more quickly than the overcurrent relays. Therefore, the power directional relays in a faulty supply circuit effect the opening of the circuit breaker therein before the overcurrent relays in the other supply circuits effect the opening of their respective circuit breakers and consequently only the circuit breaker in the faulty supply circuit is opened.

The fault on the supply circuit also effects in any suitable manner the disconnection of the circuit from its source of current so that voltage relay 13 associated therewith opens its contacts 12. Therefore, the opening of a circuit breaker 3 in the faulty supply circuit does not effect the operation of its associated reclosing means until the voltages on all the phases of the supply circuit have been restored to normal so that the polyphase voltage relay contacts 12 are closed. After the voltages of all of the phases of the supply circuit have been restored to normal a predetermined length of time, the associated timing device 10 effects the reclosing of the associated circuit breaker 3 in the manner above described.

It will be observed that since each circuit breaker can be reclosed only when the voltages on all the phases of the associated supply circuit are normal, it is reclosed only under conditions which will cause power to flow from the supply circuit to the load circuit. Therefore, faults on a supply circuit do not effect the locking out of the associated circuit breaker. If, however, the voltage indication of each supply circuit were obtained by a single relay connected to one phase of the supply circuit only, a permanent fault on a phase to which the relay is not connected would effect the locking out of the associated circuit breaker.

From the above description, it will be observed that our arrangement is such that when a circuit breaker is opened in response to a fault on the associated supply circuit the fault may remain connected to the supply circuit indefinitely without effecting the locking out of the circuit breaker whereas when the fault is on the load circuit the circuit breaker is locked out if the fault is not removed within a predetermined time. Therefore, our invention permits each circuit breaker to be reclosed an indefinite number of times in case of faults on the associated supply circuit provided that the fault is cleared from the supply circuit as indicated by the presence of normal three-phase voltage, but will be reclosed only a predetermined number of times in case of a sustained fault on the load circuit.

While we have in accordance with the patent statutes shown and described our invention as applied to a particular system and as embodying various devices diagrammatically indicated, changes and modifications will be obvious to those skilled in the art and we, therefore, aim in the appended claims to cover all such changes and modifications as fall within the true spirit and scope of our invention.

What we claim as new and desire to secure by Letters Patent of the United States, is:

1. In combination, a load circuit, a plurality of supply circuits connected thereto, means for effecting the disconnection of said supply circuits from said load circuit and the automatic reconnection thereto after predetermined time intervals, means for preventing the reconnection of a supply circuit to said load circuit after the supply circuit has been connected thereto a predetermined number of times, and means responsive to a predetermined electrical condition of said load circuit for effecting the reconnection of any of said supply circuits to said load circuits which may be disconnected therefrom whenever said predetermined electrical condition occurs and said supply circuits are energized.

2. In combination, a load circuit, a plurality of supply circuits connected thereto, means for effecting the disconnection of said supply circuits from said load circuits, reclosing means for effecting the reconnection of said supply circuits to said load circuit in a predetermined sequence, lockout means for preventing said reclosing means from reconnecting a supply circuit to the load circuit after the supply circuit has been reconnected thereto a predetermined number of times, and means responsive to the voltage of said load circuit for removing said reclosing means from the control of said lockout means so as to effect the reconnection of the locked-out supply circuits to the load circuit.

3. In combination, a load circuit, a plurality of supply circuits, a circuit breaker associated with each supply circuit for effecting the connection thereof to said load circuit, means for opening each of said circuit breakers, reclosing means associated with each circuit breaker arranged to reclose them in a predetermined sequence, means for locking out each circuit breaker against further automatic reclosing thereof after it has been reclosed a predetermined number of times, and means responsive to a predetermined electrical condition of said load circuit subsequent to a circuit breaker being locked out for effecting the operation of the reclosing means associated therewith to reconnect the associated supply circuit to said load circuit.

4. In combination, a load circuit, a plurality of supply circuits connected to said load circuit, a circuit breaker in each supply circuit, overload responsive means associated with each circuit breaker for effecting the opening thereof, means for reclosing said circuit breakers when they are opened including timing means associated with each supply circuit and having different times of operation whereby said circuit breakers are closed sequentially when a plurality of said circuit breakers are opened simultaneously, means associated with each circuit breaker for rendering the reclosing means associated therewith inoperative to reclose the circuit breaker after it has been reclosed a predetermined number of times, and means responsive to a predetermined voltage of said load circuit after a reclosing means has been rendered inoperative for effecting the operation of the reclosing means to reclose the associated circuit breaker.

5. In combination, a load circuit, a plurality of supply circuits connected to said load circuit, a circuit breaker in each supply circuit, overload responsive means associated with each circuit breaker for effecting the opening thereof, means associated with each circuit breaker for effecting the reclosing thereof after it has been open a predetermined time, said reclosing means being arranged to effect the sequential closing of said circuit breakers when they are opened simultaneously, lockout means associated with each reclosing means for rendering the associated reclosing means inoperative if the circuit breaker controlled thereby is open after a predetermined time, and means responsive to the voltage of said load circuit for resetting the lockout means associated with a locked out circuit breaker so that the reclosing means associated therewith is again rendered operative to reclose the circuit breaker.

6. In combination, a load circuit, a plurality of supply circuits, a circuit breaker in each supply circuit, overload responsive means associated with each supply circuit and controlling the opening of the circuit breaker therein, a motor operated timing device associated with each circuit breaker for effecting the reclosing of the associated circuit breaker after it has been open a predetermined time, said timing devices being arranged so that they effect the sequential reclosing of said circuit breakers when they are opened simultaneously, means associated with each timing device for preventing it from operating to effect further reclosing of the associated circuit breaker if the breaker does not remain closed after a predetermined number of reclosures, and means responsive to the voltage of said load circuit for effecting the operation of the inoperative timing devices to reclose their respective breakers after the load circuit voltage has remained above a predetermined value for a predetermined time.

7. In combination, a load circuit, a supply circuit connected thereto, a circuit breaker between said circuits, means for opening said circuit breaker, timing means for controlling the reclosing of said circuit breaker including a starting circuit, and electroresponsive means in said circuit arranged when energized to effect the operation of said timing means, and means controlled by said timing means and the voltage of said load circuit for controlling said starting circuit so as to prevent energization of said electroresponsive means if said voltage is below a predetermined value after said timing means has been in operation a predetermined time.

8. In combination, a load circuit, a supply circuit connected thereto, a circuit breaker between said circuits, means for opening said circuit breaker, timing means for controlling the reclosing of said circuit breaker including a starting circuit, electroresponsive means in said circuit arranged when energized to effect the operation of said timing means, means responsive to the opening of said circuit breaker for completing said starting circuit, and means controlled by said timing means and the voltage of said load circuit for opening said starting circuit when said voltage is below a predetermined value after said timing means has been in operation a predetermined time and for maintaining it open until said voltage is subsequently restored to a predetermined value.

9. In combination, a polyphase supply circuit, a polyphase load circuit, a circuit breaker connecting said circuits, means for effecting the opening of said circuit breaker in response to faults on said supply circuit and on said load circuit, reclosing means for said circuit breaker responsive to the opening thereof for effecting the reclosing thereof after it has been open a predetermined length of time and for locking it out against further reclosures after it has been reclosed a predetermined number of times within a predetermined time, and means responsive to the voltages on all the phases of said supply circuit for controlling said reclosing means so that it is operative to lock out said circuit only in response to faults on said load circuit.

10. In combination, a polyphase supply circuit, a polyphase load circuit, a circuit breaker connecting said circuits, overload means for effecting the opening of said circuit breaker in response to faults on said load circuit, reverse power means for effecting the opening of said circuit breaker in response to faults on said supply circuit, and reclosing means including means responsive to the voltage of each phase of said supply circuit for effecting the reclosing of said circuit breaker after it has been open a predetermined time and for locking it out against further reclosures, only in response to faults on said load circuit, if it fails to remain closed after being reclosed a predetermined number of times.

11. In combination, a polyphase load circuit, a plurality of polyphase supply circuits, a separate circuit breaker between each supply circuit and the load circuit, overload means associated with each circuit breaker for effecting the opening thereof in response to faults on the load circuit, reverse power means associated with each circuit breaker for effecting the opening thereof in response to faults on the associated supply circuit, reclosing means associated with each circuit breaker for effecting the reclosing thereof in response to the opening thereof, after it has been open a predetermined time and for locking it out after a predetermined number of reclosures within a predetermined time and means associated with each supply circuit and responsive to the voltages on all of the phases thereof for controlling the associated reclosing means so that it effects the locking out of the associated circuit breaker only in response to faults on the load circuit.

In witness whereof, we have hereunto set our hands this 26th day of December, 1928.

ARVID E. ANDERSON.
FREDERIC D. KING.